United States Patent
Ashworth et al.

(10) Patent No.: US 7,093,247 B2
(45) Date of Patent: Aug. 15, 2006

(54) INSTALLATION OF A DATA PROCESSING SOLUTION

(75) Inventors: Lindsey Louise Ashworth, Romsey (GB); David John Howard, Blandford Forum (GB); Helen Postlethwaite, Chandlers Ford (GB); Graham Derek Wallis, West Wellow (GB)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 09/999,640

(22) Filed: Oct. 25, 2001

(65) Prior Publication Data

US 2003/0018963 A1    Jan. 23, 2003

(30) Foreign Application Priority Data

Apr. 10, 2001    (GB) .................................. 0108924.2

(51) Int. Cl.
*G06F 9/445*    (2006.01)
(52) U.S. Cl. ........................................ 717/174; 717/175
(58) Field of Classification Search ................ 717/174, 717/175, 176, 177
See application file for complete search history.

(56) References Cited

U.S. PATENT DOCUMENTS

| 5,581,764 | A | 12/1996 | Fitzgerald et al. | 395/703 |
| 5,835,777 | A | 11/1998 | Staelin | 395/712 |
| 6,117,187 | A | 9/2000 | Staelin | 717/11 |
| 6,202,207 | B1 | 3/2001 | Donohue | 717/11 |
| 6,327,706 | B1 * | 12/2001 | Amberg et al. | 717/174 |
| 6,363,499 | B1 * | 3/2002 | Delo et al. | 714/15 |
| 2002/0133814 | A1 * | 9/2002 | Bourke-Dunphy et al. | 717/174 |

* cited by examiner

*Primary Examiner*—Wei Zhen
*Assistant Examiner*—Qamrun Nahar
(74) *Attorney, Agent, or Firm*—David A. Mims, Jr.

(57) ABSTRACT

Provided are methods and computer programs for managing installation of a set of data processing components. An installation manager program allows users to specify which of a set of predefined functional roles are to be implemented on which of their data processing systems and then the installation program automates installation of the set of data processing components which correspond to the specified roles.

14 Claims, 4 Drawing Sheets represents application function

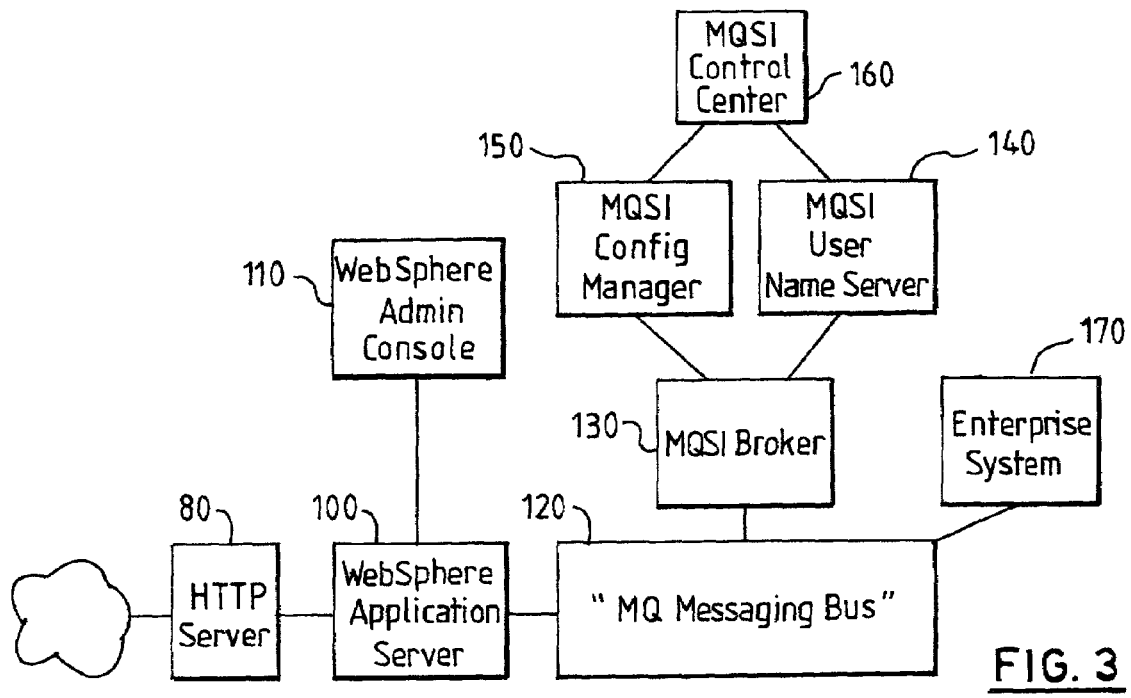

FIG. 3

| Table | Machine roles and components for each role |
|---|---|
| Role | Component products required for that role |
| HTTP Server | IBM HTTP Server |
| Broker | MQSeries Integrator Broker<br>DB2<br>MQSeries server |
| Application Server | WebSphere Application Server<br>MQSeries JavaClient<br>JMS<br>DB2 |
| Queue Manager | MQSeries server<br>JMS |
| MQSeries clients | MQSeries Java client and NT client |
| internet pass-thru | internet pass-thru |
| Configuration Manager | MQSeries Integrator Configuration Manager<br>DB2<br>MQSeries server |
| Administration Console for WebSphere | WebSphere Administration Console<br>DB2 |
| User Name Server | MQSeries Integrator User Name Server |
| Control Center | MQSeries Integrator Control Center<br>MQSeries JavaClient |

FIG. 4

INSTALLATION OF A DATA PROCESSING SOLUTION

FIELD OF INVENTION

The present invention relates to methods, computer programs and apparatus for easing installation of a complex data processing solution.

BACKGROUND

It is becoming increasingly rare for businesses to use application programs in isolation from other programs, and applications and systems integration within and between organizations have become vital. As the number of computing-based business applications increases and their interdependencies become more complex, the complexity of this integration is also increasing rapidly. In the modern computing environment, the construction of e-business solutions (business applications implemented using date processing and communications hardware and software) typically requires that the solution design is followed by installation of a large number of products, or components of those products, across a multi-machine topology. Installation in this context means adding products and components to machines within the topology in such a manner that the products and components can run and intemperate properly with all affected programs in the system. Some components are dependent on others and Therefore sets of components must be installed together. Some groups of components must be installed in a particular sequence for The combination of components to operate correctly.

In a multi-tier solution topology which uses a set of components, the separate machines each require different sets of components to be installed onto them. System administrators must, when determining which sets of components are required for the different machines, take into consideration the dependencies between components. For example, to perform required functions, a message broker program may require specific levels of operating system and database support, directory services, a messaging manager for handling network communications, and a set of Java™ classes implementing the Java Message Service interface, which in turn requires a Java run-time environment. (Java is a trademark of Sun Microsystems, Inc). While this is merely one example, it demonstrates that the combination of computer programs' fixed pre-requisites and dependencies which are specific to the functional role of a program within a specific solution can result in great complexity when installing a complete solution. The installation requirements can be difficult to determine and to express concisely and consistently. There is a steep learning curve for potential e-business solution customers who must be aware of all the dependencies of every component, which is not only time-consuming and difficult, leading to long delays in the definition of solution topologies and the deployment of solutions, but it also leads to an error-prone installation process with a commensurate increase in costs in problem diagnosis and rectification.

The rapid growth of the World Wide Web internet service in recent years has fuelled the increasing complexity of computing solutions. There has been an evolution of Web sites from servers of static HTML to enterprise portals providing access to information and the ability to conduct business transactions, for both Web-users and other businesses connected to the Internet. The construction of such systems is a difficult task and one which presents an architect or designer with many choices. It is recognized that organizations that are implementing e-business solutions incorporating enterprise application integration (EAI) may take different approaches, depending on what solutions they are already using.

For example, an organization might be an existing Web-centric business that has already implemented a Web site presenting static HTML, moved on to generation and delivery of dynamic content, and might even have implemented the ability for Web users to conduct business transactions that are served by a Web Application Server in conjunction with a Database Server. Next, the organization needs to include access from these same Web business methods to Enterprise Application Integration (EAI) hubs. Alternatively, an organization might be an existing EAI user that uses asynchronous messaging to communicate between a variety of systems to provide an integrated enterprise. Now the organization wants to provide Web-access to its systems. In other cases, organizations need to construct an entirely new e-business solution architecture.

In each of these examples, the tasks of deciding which set of components need to be installed on each data processing system of a network and then managing the installation of all of the interdependent components are very time consuming and error prone.

Assistance with controlled updating of software packages is provided by U.S. Pat. No. 5,581,764. This discloses automated management of changes in a distributed computing environment, constructing a 'resource needs list' for individual computers in response to interrogation of their configurations. The update automation involves a calculation of differences between the currently installed resources and 'resource needs lists' for each computer, but it relies heavily on a set of changeable but nevertheless predefined rules for computer configurations (i.e. rules specifying which components should be installed on computers in accordance with configuration policies ('needs lists') for different categories of computer and in accordance with their technical capabilities).

Although useful for update management after the configuration policies have been defined, U.S. Pat. No. 5,581,764 does not disclose any solution to the problem faced by a system administrator or solution architect when constructing a data processing solution of determining which set of components are required to enable each computer to perform specific sets of functions or "roles" within the desired data processing solution. There remains a very significant initial task for architects to define configuration policies ('needs lists') which specify the set of components to install on each computer to implement an overall e-business solution.

U.S. Pat. No. 5,835,777 and U.S. Pat. No. 6,117,187 describe generating a list of software dependencies and determining which installable resources (shared libraries) are needed by the listed software, but this determination of pre-requisites is limited to predefined minimum pre-requisites of individual software components. This does not involve consideration of the functional roles of each component or computer system within a particular data processing solution. U.S. Pat. No. 6,202,207 also discloses checking lists of standard pre-requisites with no consideration of the role of each component or system in an overall solution.

SUMMARY OF INVENTION

In a first aspect of the present invention, there is provided a method of managing installation of a set of data processing components onto a data processing system, the method comprising: responsive to specification of data processing functions which are to be performed within a data processing system, invoking an installation process to determine, with reference to predefined function-specific groups of components, which set of data processing components are required to perform the specified functions and then to install the respective determined set of data processing components onto the data processing system.

The step of determining required sets of components preferably entails accessing a table (any table or list structure or database) which lists the required group of components for each of a plurality of functional roles, the predefined function-specific groups of components taking account of any fixed pre-requisites of individual components as well as function-specific dependencies. The table or database preferably also lists the system capabilities required to perform those roles, and in a particular preferred embodiment of the invention temporary requirements such as temporary disk space required at installation-time are taken into account as well as run-time system requirements.

The installation preferably involves accessing from a recording medium a set of data processing components identified by reference to the table or database, and a program for performing the installation process (an installation manager or "install wrapper" program) is also preferably recorded on this medium. The medium may be a CD-ROM or other portable medium, or may be located at a network-connected server data processing system which is remote from the system on which components are being installed.

The installation process' determination of required components is enabled by using defined groups of data processing resources in which each group corresponds to a separable unit of deployable function. This is not merely a list of components corresponding to a desired configuration for a category of computers within a network, since it allows the user or solution architect to decide which functional roles should be performed by which computers within his topology and then automates installation after that decision has been made. The defined groups of related data processing resources forming a unit of deployable function will be referred to herein as "role groups" and the data processing functions which are specifiable to invoke installation of a role group will be referred to herein as "roles".

The specification of a desired role is at a higher level of abstraction than specifying all of the individual data processing components that form role group. The invention enables users to work with abstract references to functions that will be performed within the user's overall solution, without needing detailed knowledge of which set of components makes up a role group which implements each function and without needing to know the interdependencies of the components within the group. The level of abstraction of role groups is highly advantageous because it allows the user or architect to move from their early abstractions of a solution to the final implementation with far less work and knowledge than is required by any known solutions.

The invention can greatly reduce the difficulty of determining and implementing an appropriate installation strategy (i.e. which components, on which system, and installed in which order) for a complex multi-component data processing solution, with significant savings in installation time and reductions in errors. Another advantage of using predefined role groups according to the preferred embodiment of the invention is that the roles within the solution topology will then be guaranteed to interoperate correctly because they have been defined to be complementary.

In a preferred embodiment of the invention, role groups have been defined to be more than just a collection of software components and pre-requisites. A number of role groups have been defined to encapsulate the key building blocks of a solution topology, and to interoperate correctly with any machine which performs a complementary role (such as a "broker" role group interoperating with an "application server" role group without requiring users to write any additional glue code to achieve this interoperation). Thus, as well as role groups representing units of deployable function comprising sets of software components which are required to implement specific sets of functions, they also provide a logical partitioning of the set of all possible combinations of data processing components within a suite into those sets which will be particularly useful for building data processing solutions. The user who constructs a particular data processing solution can then work with abstract references to the building blocks with assurance that the final solution will perform the required functions and that all components and role groups will interoperate correctly.

In a preferred embodiment of the invention, the user is also not required to be the final arbiter of whether his computer systems have the technical capabilities to perform the roles that the user specifies for those systems, because system capabilities are interrogated and checked against the technical requirements of the role groups of components that correspond to the functional roles specified by the user. These technical requirements are preferably stored in the above-mentioned table or database. Implementing this checking step after the determining step but before installation begins enables a timely warning to be given to the user or solution architect that his solution design and/or system topology needs to be reviewed if the specified functional roles cannot be performed by the systems he has selected. This check preferably involves installation-time requirements such as temporary disk space as well as run-time requirements, and it can be extended to cater for performance requirements which take account of predicted run-time workloads.

In a preferred embodiment, the installation process implements a merging of role groups when multiple roles are specified for an individual data processing system, to avoid undesirable duplication of components and yet to ensure that all the required data processing components are available on that system.

Preferably, the installation process according to the invention determines an appropriate installation sequence which takes account of the required install sequence for correct operation of the overall solution. This is enabled by each role group having a set of stored installation instructions including the required install sequence, and the installation process implementing a merging of these instructions when merging role groups to implement a plurality of roles on a single system. This may be implemented by defining a global installation sequence which will be successful for all components within a suite, and then the merging of installation instructions involves identifying from the table or database all the components within the merged role groups and then identifying their positions in the global installation sequence.

A further advantage of the present invention is that the partitioning of data processing solutions into their key functional roles enables example data processing solutions to be defined and managed in terms of roles and role groups. This enables a suite of programs to be delivered together with definitions of example data processing solutions which use the programs in the suite, the definitions of example solutions including predefined configuration data for the example solutions. Since users will be able to create a specific solution by selecting a predefined example solution which most closely resembles their desired solution and then customizing, this provision of example solutions defined in terms of roles and role groups can be extremely useful for users of the program suite.

In a second aspect, the invention provides a computer program product comprising a plurality of computer program components recorded on a machine-readable recording medium, wherein the plurality of program components includes: a set of installable computer program components; an installation manager program which is responsive to specification of data processing functions which are to be performed within a data processing system to determine which subset of the set of data processing components are required to perform the specified functions, by reference to predefined function-specific groups of components, and then to install the determined subset of data processing components onto the data processing system.

In a third aspect, the invention provides a method of generating an installation program for managing installation of a set of data processing components onto a data processing system, the method comprising: analyzing a data processing solution architecture to identify a set of separable functional roles which interoperate to provide the solution architecture; partitioning the data processing solution architecture into groups of data processing components wherein each group of components corresponds to one of the identified functional roles; and providing an installation program with a definition of each of the set of functional roles, each definition including a list of the data processing components of the respective group, wherein the installation program is responsive to specification of one or more functional roles to be implemented on a data processing system to access the respective definition and to invoke installation of the respective list of data processing components.

Embodiments of the present invention can be used to provide assistance in the architectural design and construction of e-business solutions that encompass Web access, application serving, asynchronous messaging, and access to enterprise servers.

BRIEF DESCRIPTION OF DRAWINGS

Preferred embodiments of the invention will now be described in more detail, by way of example, with reference to the accompanying drawings in which:

FIG. 3 is a more detailed representation of a set of products implementing the business logic and decomposition/recomposition rules of FIG. 1;

FIG. 4 lists the component products corresponding to each of a set of "roles" according to an embodiment of the invention;

DETAILED DESCRIPTION OF PREFERRED EMBODIMENTS

Figure 1:
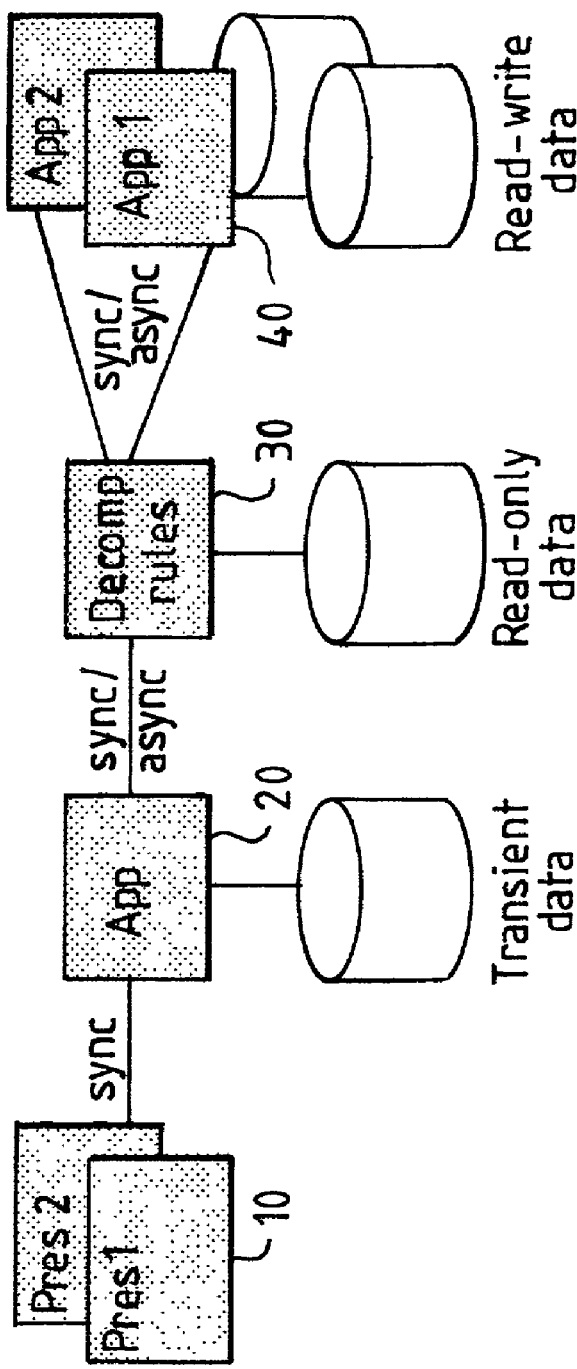
FIG. 1 is a schematic representation of a logical view of an example application topology.

Designing the architecture of and constructing e-business solutions that encompass Web access, application serving, asynchronous messaging, and access to enterprise servers are complex tasks. There is a desire for computer program products which can provide assistance with these tasks. In view of the complexity of typical e-business solutions, "suites" (or collections) of computer programs, plus associated documentation, data and example code, may be provided to enable individual businesses to select the particular set of functional components required for their desired business solution. It is known for these suites to include their programs' pre-requisite components (for example, if an Application Server depends on a Database Server). Further, it is common for a suite of programs to include an installation program to assist with installation of components within the suite. The installation program may invoke individual installation programs of each the products included in the suite. Such an installation program is often referred to as an "install wrapper".

The number of products contained within a suite may be high and this combined with the number of choices that each installation program presents to the user, can lead to an unacceptable amount of dialogue between the installation programs and the user, which is both time-consuming and frustrating to the user and also introduces risks of errors being made, such as inconsistent choices of pathnames or components. It is preferable to minimise this dialogue where possible and a well designed suite will have an install wrapper that asks the user for a small number of inputs and then uses those inputs to make inferences about what should be installed and where it should be installed. The install wrapper then invokes the individual installation programs and supplies them with simulated user responses using the settings that the install wrapper has inferred. This style of invocation of the individual installation programs is referred to as "silent install" and means that the individual installation programs do not solicit input from the user or provide interim feedback; only the install wrapper conducts screen dialogues.

Nevertheless, known install wrappers only provide limited help for solution architects such that solution architects have a major task to plan for, design and construct each different solution.

Patterns

A first step for many solution architects is to understand what business pattern they wish to implement. In many cases it is possible to take a solution architect's requirements, including the business problem to be solved and any constraints such as the inclusion of existing systems, and to use these to select one of a number of business patterns. At its simplest, a business pattern is merely an overview of the relationships between end users of the solution, which can be used to identify architecture and design principles that are relevant to constructing e-business solutions according to that business pattern. Computer-based tools may be provided to encapsulate these architecture and design principles for each of a number of predefined business patterns. For example, the following different business patterns can be identified:

User-to-business

User-to-online buying

Business-to-business

User-to-user

User-to-data

Application integration

For each of these very high-level business patterns, a number of logical patterns and physical patterns can be identified. One example of a logical pattern is a logical application topology, which describes the interactions between entities such as users, applications and data within the solution. A logical application topology is normally related closely to the other form of logical pattern, which is a logical runtime topology, showing the runtime infrastructure needed to achieve the business functions. Within a logical runtime topology, functional requirements can be grouped into 'nodes', which are interconnected to solve the business problem. The transition from a business pattern to a logical pattern is one possible refinement (next level of detail leading towards implementation) of a business pattern. There may be multiple possible refinements of a business pattern and it is possible to abstract once again and try a different refinement.

A logical topology (application or runtime) takes into consideration various constraints, such as existing systems that will form part of the overall solution. In the same way that there can be multiple refinements of a business pattern, a logical runtime topology can be refined by one or more product mappings. A product mapping shows which products can be used to implement a logical runtime topology and shows the relationships between the products. In doing so, it should take into consideration the platform preferences of the customer. It can also position them relative to some of the physical boundaries in the system (for example, the domain firewall).

However, a product mapping still does not show the full physical topology, because it does not show exactly how many machines are installed with instances of a particular product, or whether different (adjacent) products are installed onto separate machines or whether they can be co-located. A physical topology can be derived from the product mapping and will reflect performance considerations and physical constraints and dependencies.

Furthermore, all of the patterns and topologies mentioned so far are abstractions from the physical components which actually implement a solution, since even a physical topology is still at a level of abstraction above that normally used by systems architects when trying to construct a data processing solution. Using prior art solutions, an architect or user has to generate a detailed list of data processing components which are required to be installed on each data processing system of a data processing system topology to implement an overall solution. The task of determining an appropriate physical implementation of a logical or physical topology remains a complex and error prone task.

Logical Patterns

An application integrator product comprising a suite of computer programs (hereafter referred to as an "AI suite" can be used to provide all the components for constructing a physical product implementation for a number of the above business patterns. For now, let us consider the user-to-business pattern. For example, take the user-to-business pattern that is the general case of users (internal to the enterprise or external) interacting with enterprise transactions and data. It is relevant to those enterprises that deal with goods and services not normally listed in and sold from a catalog. It covers all user-to-business interactions not covered by the user-to-online buying pattern. This business pattern also covers the more complex case where there is a need to access back-end applications and data.

Examples of the user-to-business pattern can include:
Convenience banking
    View account balances
    View recent transactions
    Pay bills-transfer funds
Discount brokerage
    Portfolio summary
    Detailed holdings
    Buy and sell stocks
Insurance industry
    Locate a nearby office
    Policy summary and details
    Claims submission and tracking
Telecommunications and wireless industry
    Review of account statements
    Paying bills online
    Change personal profile
    Add/change/remove services
Government
    Submit tax returns
    Renew automobile licenses
    Download or submit forms/applications
Manufacturing
    Review required parts/services,
    Locate service centers One possible application topology of the user-to-business pattern is shown in FIG. 1. A user interacts with the presentation logic 10 to cause an application program 20 to perform business logic functions. For example, this may initiate a funds transfer request if the business is a bank. This application program 20 initiates a communication which invokes dynamic decomposition and recomposition rules 30 (such as filtering, formatting or routing messages) and then the message or a derived message is sent to business logic 40 at the back end (such as the funds transfer processing at the bank).

Product Mappings

The logical application topology shown in FIG. 1 has many possible physical refinements, which will be guided by factors such as performance considerations, what existing systems are in use, customer preferences, and possibly cost. This logical application topology does not specify whether the interactions between the application and decomposition rules and between the decomposition rules and the enterprise applications are synchronous or asynchronous—it permits either. If these factors led to a product mapping based on, for example, IBM Corporation's MQSeries Integrator product as the engine that will apply the decomposition and recomposition rules, the interactions into and out of the decomposition rules entity will be asynchronous, because the natural way to interact with MQSeries Integrator is by MQSeries messages. Alternatively, a different refinement could be followed, which uses, for example, IBM Corporation's Component Broker product. (IBM, MQSeries and Component Broker are trademarks of International Business Machines Corporation).

Figure 2:
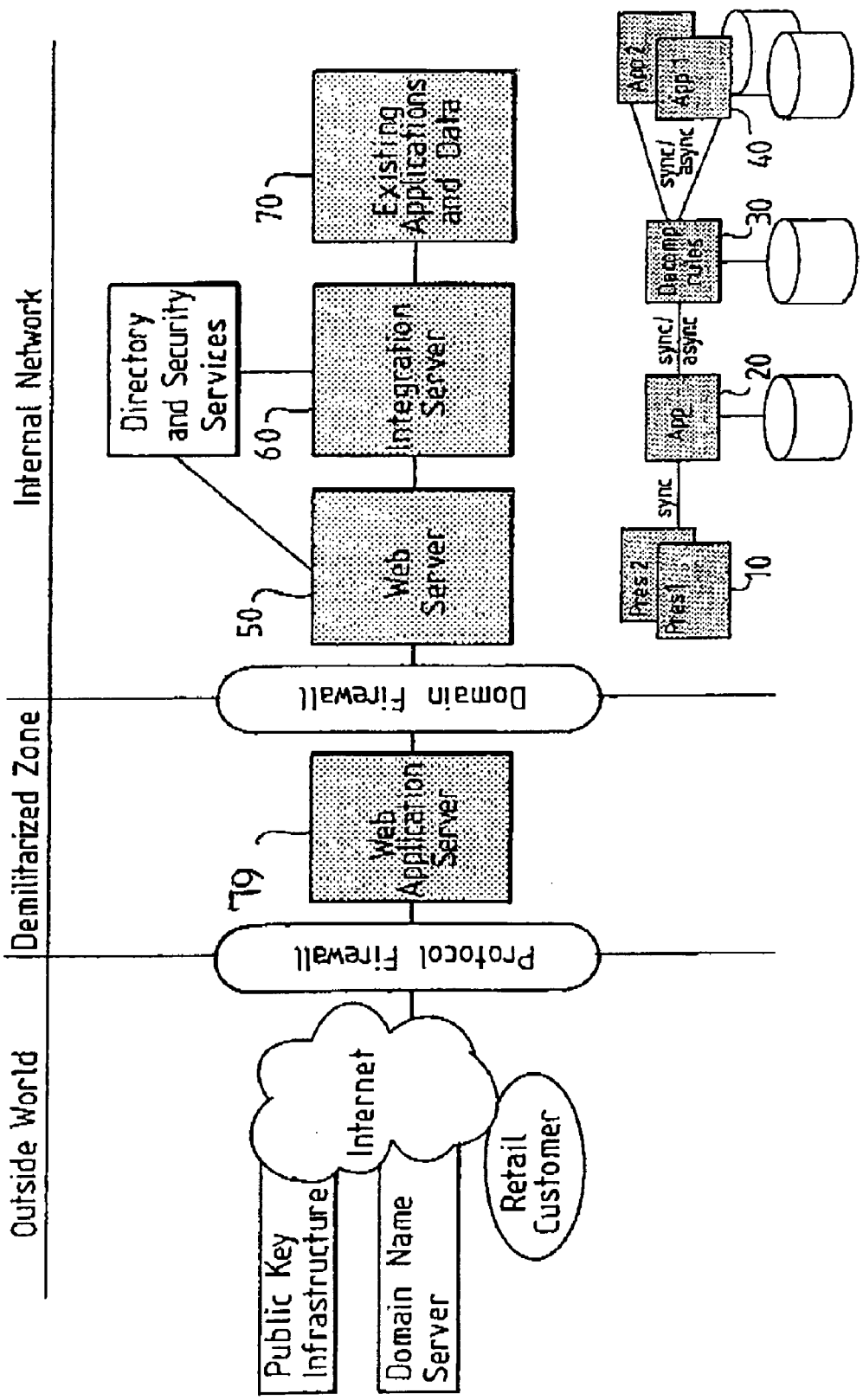
FIG. 2 is a schematic representation of a high level solution architecture comprising a set of products corresponding to the logical application topology of FIG. 1.

FIG. 2 shows one possible product mapping that refines the above logical application topology. The logical application topology is included in the diagram to show the mapping from logical/entities to products. Each component of the product mapping implements the logical entities that are shown directly beneath it. For example, a Web Application Server 50 is responsible for providing the presentation logic 10 for user interactions and the business application logic 20 with which the user interacts. An integration server 60 or broker provides the decomposition processing 30, and the bank's internal data processing functions 40 for funds transfer are provided by their existing application programs and data 70.

Physical Topologies

The product mapping of FIG. 2 does not specify anything about the physical distribution of components across machines. It would be possible to implement this product mapping with various distributions of the necessary products, product components, and service instances across physical machines. The chosen distribution must take into consideration a number of basic factors, such as constraints imposed by the placement of existing data and applications, any dependencies between components, and the machine capabilities required by each component. For example, a message broker typically must be on the same machine as the message queue manager that serves it.

Similar considerations apply to the placement of components at installation. For example, capacity planning is implemented to determine whether instances of the AI suite's programs should be clustered and how many Java Virtual Machines and how many physical machines will be required to handle the expected peak loading of an application server within the solution.

There are also a number of other advanced considerations:

Which machines should be placed in the unprotected zone between the packet filter and the domain firewall and how are they to be accessed?

Similar analysis is required to identify whether there are any single points of failure in the architecture.

Where there are multiple instances of a service, how is workload to be distributed between them?

Which machine(s) is the system to be configured and monitored from.

Clearly, the task of reviewing all of these issues to design a suitable solution architecture is very complex and time consuming, requiring the architecture designer to have a very detailed knowledge of the available software products and computer systems.

Before discussing physical topologies in more detail, it will be useful to look again at logical topologies and product mappings as exemplified in FIGS. 1 and 2. It is possible to expand the level of detail to show the product components that relate to each of the boxes labelled "App" 20 and "Decomp rules" 30, to identify the key functional components of a solution. An example of this is shown in FIG. 3. In this example, the major functional components of the Web application server 50 are an application server 100 (such as IBM Corporation's WebSphere Application Server product) and an administration console 110 (such as IBM's WebSphere Administration Console product). The major functional components of the integration server 60 are a messaging manager 120 (such as IBM's MQSeries queue manager product, represented as "MQ messaging bus" in FIG. 3), a message broker 130 (IBM's MQSeries Integrator broker product), a configuration manager 150 (IBM's MQSeries Integrator config manager), a name server 140 (MQSeries Integrator User Name Server), and a control centre 160 (IBM's MQSeries Integrator Control Centre product). The integration server 60 communicates, via the messaging manager 120, with an enterprise system 170 implementing the back end applications and data 70.

Now consider a computer program product comprising an AI suite of data processing components including all of the major products shown in FIG. 3. Installing all the components including their fixed pre-requisites and additional function-specific pre-requisites in a chosen physical topology onto the appropriate machines, and testing that they work correctly together, would be a significant undertaking. An installation manager program implementing the present invention can make the planning and implementation of this task much easier.

Installation Manager

The installation manager program is based on the concept of "roles" and "role groups" of data processing components or resources. These components or resources are mainly executable programs, but can include other items such as configuration files. A role group is a group of data processing components, which together form a unit of deployable function. For example, each of the boxes shown in the product mapping of FIG. 3 can be implemented by a role group of components. An example of a role group is the "MQSeries Integrator Broker" role group 130, which includes IBM's MQSeries Integrator runtime broker program, IBM's MQSeries messaging manager software, and IBM's DB2 database program, all of which are required to support the activities performed by the "MQSseries Integrator Broker" role group 130. (DB2 is a trademark of IBM Corporation).

Role groups are a practical alternative to the provision of a set of predefined or "canned" system and network topologies, in which each system has a predefined configuration. An approach relying on canned topologies typically limits the flexibility of what users can set up, since only some arrangements will have been defined. Alternatively, a precanned approach which has a comprehensive set of selectable topologies (any set of components in any arrangement) would present users with such an overwhelming set of choices that it would not be practical to use. Role groups provide a useful partitioning of the overall data processing solution so that a solution designer can work at the level of abstraction of the roles and role groups.

This allows users to work from the logical topology or product mapping which would normally be an intermediate without needing to delve into the details of component dependencies. To aid understanding, an example of role groups of components is represented in FIG. 3 in which each role corresponds directly to one box on the product mapping. This is a significant abstraction compared with a true physical topology since the physical implementation of FIG. 3 would involve a detailed list of components corresponding to each box, to take account of components' fixed pre-requisites and the function-specific dependency relationships between components.

There may be exceptions to the typical one-to-one mapping between role groups and the boxes of FIG. 3. For example, the MQSeries Messaging Bus shown in FIG. 3 may have different role groups depending on the particular combination of servers (queue managers) and clients that implement it. There may be many other roles which are not represented in the example of FIG. 3 (such as MQSeries internet pass-thru in the following list of roles).

A particular example of the product components that may be associated with individual roles is shown in Table 1 of FIG. 4.

With the installation manager program, role groups are the smallest installable units that users need to deal with and this shielding of users from the complexity of pre-requisites and role-specific dependencies is a major benefit to many users—if not all users. If a user wanted to install or upgrade a specific portion of a role group, they can still do that by running the appropriate product install program directly or copying the necessary files manually.

In one example implementation of the invention, which corresponds to the example of FIG. 3, the following roles have been defined:

HTTP Server

The HTTP Server 80 listens for HTTP requests from clients and passes them on to the Application Server 100. In general, a solution may contain multiple instances of (optionally heterogeneous) Web servers. In general, users can install multiple instances of any role group. For a first example, a solution using an AI suite may use one instance of the IBM HTTP Server product. There may be either local or network connections between the Web Server and Application Server. This means that, for this example, the Web Server can either be co-located with the Application Server or be installed on a separate machine.

WebSphere Application Server

An example Application Server 100, which may be included in an AI suite, is IBM WebSphere Application Server Advanced Edition, which supports servlets, HTML pages, JavaServer Pages, and Enterprise Java Beans. There may be multiple instances of the Application Server within a solution architecture. Instances have a many-to-one relationship with a WebSphere Administration Server, which must be on the same machine. The combination of WebSphere Administration Server and many Application Server instances can be replicated on separate machines. As a first example, let us assume there is one machine running one Administration Server and one Application Server instance. (IBM and WebSphere are trademarks of International Business Machines Corporation).

WebSphere Administration Console

The WebSphere Administrative Console 110 is the interface used to set up and manage an Administration Repository of the Administration Server and the Application Server. The Administration Console runs as an EJB client and uses RMI/IIOP to connect to the WebSphere Administration Server. It can be run either locally (co-located with the Administration Server) or remotely. The installation of this role is optional with regard to running certain example solutions built from AI suite components.

MQSeries Queue Manager

An MQSeries Queue Manager is a server used to support asynchronous messaging to enable other components of the solution to communicate. At least one Queue Manager is required to implement the messaging bus 120, which may also consist of MQSeries clients. The messaging bus connects the Application Servers, Brokers and Enterprise Servers. The bus may consist of multiple Queue Managers and clients. A first example use one queue manager on the Broker machine to minimize configuration and MQSeries clients on the Application Server machine. Users have the option of installing Queue Managers on machines running Application Server instances or other applications (for example, enterprise applications) and using local bindings instead of using the clients. In a production solution architecture, there could be many instances of MQSeries Queue Managers and clients and they could reside anywhere, including in Application Servers and Enterprise Servers.

MQSeries Client

An MQSeries client is a client that can communicate with one or more Queue Managers and relies on their support for asynchronous messaging for inter-program communication. An MQSeries client can be used on machines where a Queue Manager is not required, but there must be at least one Queue Manager in order to implement the messaging bus.

MQSeries Integrator Broker

A Broker 130 runs messageflows that users create to handle message traffic. A messageflow is a sequence of message processing nodes, each of which performs actions or applies rules for formatting or other processing or for routing the message. Each broker domain can have multiple brokers. A Broker must have a Queue Manager co-located with it. For simplicity, a first example makes use of a single Broker. In examples which include MQSeries applications, these can be placed on the same machine as the Broker and they can then share the same Queue Manager. The applications are therefore installed with the Broker.

MQSeries Integrator Configuration Manager

A Configuration Manager 150 manages a broker domain, which is a collection of components and resources. The Configuration Manager for a broker domain stores the configuration in the configuration repository. One Configuration Manager is required for each domain. A first example may have only one domain and hence require one machine to be installed with an instance of Configuration Manager. Users can put it on a separate machine from the Broker, or they can be co-located. When installing and creating a Configuration Manager, its Configuration Repository is created on the same machine.

MQSeries Integrator User Name Server

A User Name Server 140 can be used to provide authentication of users and groups performing publish/subscribe operations. At least one of these may be used for each domain, to manage the access paths to resources. In general, one is sufficient but more may be used for performance and resilience. Users can put it on a separate machine from the Broker and Configuration Manager, but it must have its own Queue Manager locally.

MQSeries Integrator Control Center

The MQSeries Control Center 160 is the interface used to set up and manage the functions and facilities of MQSeries Integrator. There could be many instances of the control center.

MQSeries Internet Pass-Thru

MQSeries internet pass-thru (MQIPT) allows MQSeries systems to exchange messages without needing a direct TCP/IP connection between them. MQIPT is particularly useful if a firewall configuration prohibits a direct TCP/IP connection between the two systems. One or more MQIPTs can be placed in the communication path between two MQSeries queue managers, or between an MQSeries client and an MQSeries queue manager.

Physical Topologies

With an AI product suite incorporating the installation manager implementing the invention, users can design their own physical placement of role groups onto machines within a solution architecture, and then make use of the installation manager's automated installation of the required components to perform the functions of the respective roles.

Figure 5:
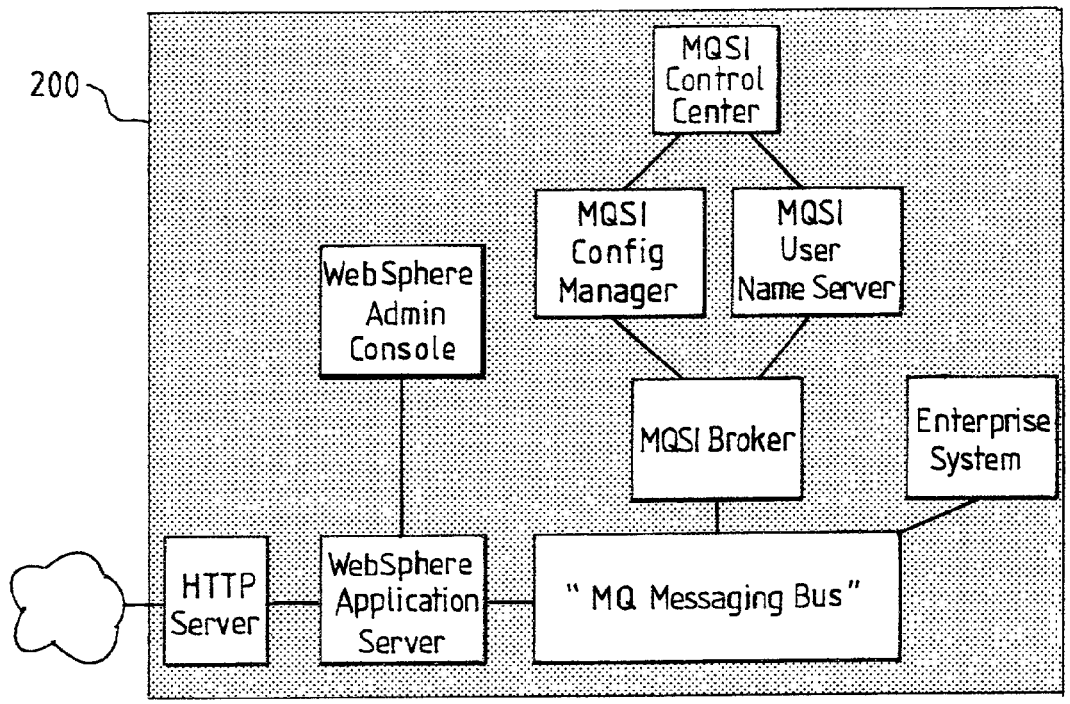
FIG. 5 is a schematic representation of a set of roles in a single machine physical topology.
Figure 6:
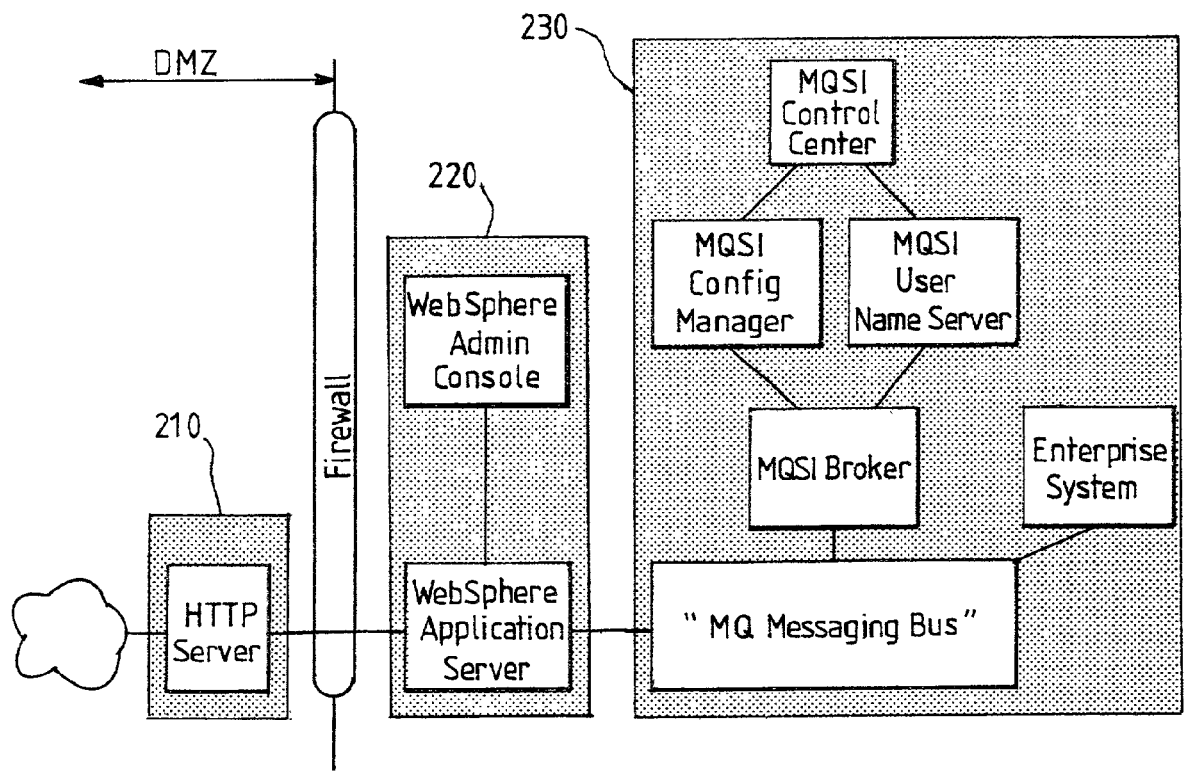
FIG. 6 is a schematic representation of a set of roles in a three-tier physical topology.

Example topologies include a single machine topology such as shown in FIG. 5, where all components are installed on a single machine 200. This is a convenient configuration for a test system to be used for evaluation or development purposes, although the storage demands can be considerable. A more typical topology for running business applications is the three-tier topology shown in FIG. 6. This separates the Web server onto a first machine 210, which could be placed in the unprotected zone with the machine 220 housing the application server being behind a firewall and a further machine 230 on which are placed the integration server (broker, messaging bus, configuration manager, name server and control centre) and back-end enterprise systems. Additional machines that have only queue managers and optional local applications on them could also be installed, but these are not shown in the Figure. The topology of FIG. 6 does not show and application server clustering, which could be added later under the control of a user of the AI suite and its installation manager.

As described above, the solution adopted according to preferred embodiments of the present invention is to group dependent components together to form "roles" and it is only at the latter level that the user is expected to make decisions. A role can be related to identifiable items in a logical topology diagram or a physical product mapping. A role provides a unit of deployable function which can be reasoned about when attempting to refine either of the above topological views into a physical topology. The economy introduced by the use of roles is that the installation program can deal with the functional units that the roles define.

Each role group is a self-sufficient entity, which leads to roles being logically independent of one another. The predefined role groups are also designed to interoperate with each other successfully. This logical independence with guaranteed interoperation provides a very simple model for generation of the physical topology, and is facilitated by the installation program which manages the translation from the set of logically independent roles to the physical set of components which must actually be installed onto a machine in order to support the set of roles that a user selects.

The installation program performs a merge of all the roles to be installed onto a machine by forming the union of the sets of components required by the roles. The installation program also determines a viable sequence in which the resulting set of components can be installed, by comparing defined installation sequences for each of the role groups being merged, such that pre-requisites are catered for. If a global installation sequence is defined for all of the computer programs within a suite to address each program's requirements, then an appropriate installation sequence for any role group or merged set of role groups can be determined by the installation manager by extracting relevant portions of the global sequence. The user does not need to be aware of the merging operation and can view the roles as completely independent. The user also does not need to be aware of any control over sequencing, and so this is preferably hidden from the user's view.

The placement of roles rather than components is much easier for the solution architect or user. Roles can be installed and uninstalled without side-effects for other roles and they are topology independent. A further benefit of roles arises when a solution topology include heterogeneous machines—roles help to simplify this by encapsulating any platform differences between the products included in a role.

A particular problem which is addressed by the preferred embodiment of the invention is that a suite of products is very likely to evolve over time, to include either additional products or to include different versions or releases of some products. The lack of synchronisation of the release schedules of the individual products can create a situation where such changes are very frequent. When such a change occurs, the set of products and their dependencies and pre-requisites all have to be changed. The refresh cycle for the suite requires that new releases of contained products be reflected in the suite very quickly, with a minimum of recoding and re-test of the installation program ("install wrapper"). This requires that the installation program must be very easy to maintain.

An install wrapper according to an embodiment of the present invention can deal with many combinations of components ("role groups") as well as a number of products and components of those products. It organizes these types of objects by using a table-driven architecture, which enables the easy addition and removal to and from the install wrapper of role groups, products or components or modification of their dependencies or pre-reqs. The table for each type of object (role, product or component) contains attributes. Some attributes are static while others are dynamic and are used to store the current status of the installation of the object. The characteristics of a role, product or component to be included in the AI suite are distilled into common set of static attributes and are stored in the parameter tables within the install wapper.

For example, a role group (set of product components for implementing a set of functions) is represented by static attributes including Name and Description (for display purposes) and the set of Sample Files which should be installed with the role group. Further, a product is represented by attributes including pre-requisites, the index of a CD on which the product is shipped and the install path suffix for the product. A component is represented by attributes including pre-requisites, number of files, registry keys and settings. An example of a dynamic attribute is the indication of whether the installation of all products within a role is complete.

The use of a table for roles, products and components allows the dependencies between the types of object to be stored efficiently and navigated, enabling search by product, role or component.

The table is coded into the install wrapper so that it is compiled into the executable install program. It would also be possible to score the table separately, but the approach taken in the AI suite described above attempts to ensure that the information contained in the table is not rendered invalid by manual editing or corruption of the table, which could occur if it were stored separately.

An install wrapper which silently invokes installation programs typically works by invoking the included install programs in their entirety, with a set of inputs and an expected result, treating the included install program effectively as a single unit of work. However, the included install program is not independent or recoverable. If errors are encountered during a silent install, it is very difficult to provide useful details to the user and very difficult or impossible to perform cleanup/backout, except by resorting to manual uninstall and deletion and cleaning up of system registry information. It is very important, therefore that during silent installs the installation process does not fail. Many installation programs verify that fixed pre-requisites are satisfied and can report how much disk space will be required to install a certain combination of components. However, such pre-requisite checking is restricted to the scope of the individual installation program, which is concerned with only a single product. A well designed install wrapper must ensure that the pre-requisites of all the products being installed are satisfied, and this should be performed as a first step before any installation programs are invoked. It is then possible to abandon the suite install before any individual installation programs have been invoked, thereby avoiding the need for manual backout of a partially installed suite. Even with global pre-requisite checking, if the global pre-requisites are merely the aggregation of the pre-requisites of the individual products and their components, then it is possible that all of the individual installation program's pre-requisites may be satisfied and yet installation of the suite will fail due to factors that do not fall into the scope of any of the individual installation programs. An example is the use of temporary disk space freed when the system is restarted. Each installation program would normally expect that a restart would immediately follow the installation of that product, but where an install wrapper is being used that may not be the case.

When a suite is being installed, it is desirable to construct a larger unit of work that encompasses the installation of each of the included products. The pre-requisites for this larger unit of work are not simply an aggregation of the pre-requisites for the individual components. The global pre-requisites must incorporate any cross-product effects by checking that for a given sequence of product installations, the pre-requisites of each of the products will be satisfied at the time within the install sequence at which that product will be installed.

As an example, the install wrapper implementing the preferred embodiment of the present invention performs full pre-requisite checking for each of the product component sets that are to be installed. Some of these pre-requisites represent logical conditions that must be satisfied, as in a logical predicate such as:

ConditionA 'AND' ConditionB

Examples of such preconditions are whether the machine is running an appropriate level of operating system or a suitable level of JVM is installed.

One of these conditions is likely to be whether there is sufficient permanent disk space to satisfy the requirements of all the constituent products, and this gives rise to pre-requisites represented by arithmetic expressions, such as:

PermanentResourceComsumptionA '+' PermanentResourceComsumptionB

Both the above forms of pre-requisite can be stored in a table of product pre-requisites and the install wrapper combines these logically and arithmetically to form an aggregated set of global pre-requisites.

Additional pre-requisites are formed from non-linear combinations of individual pre-requisites, such as the maximum amount of temporary disk space that will be required at any time during the installation of the selected role groups of the AI suite of products. This is not simply the addition of the individual pre-requisites, since some product installation programs may relinquish their temporary space on completion, whilst others wait for the system to be restarted. Such pre-conditions to a successful installation of the role groups of the AI suite can be established by manual investigation and testing and then stored in the install wrapper's pre-requisite table. The install wrapper can then use simple logical combination of these pre-requisites in the same manner as for the logical pre-requisites described above.

By combining the product pre-requisites in the above manner, the install wrapper is able to predict with a high degree of confidence whether or not an install of any set of product components will succeed or fail and so can determine when to embark on the installation (i.e. only in the former case) and when to report a problem. This minimises the risk of failures occurring during a installation which would leave the computer system in a partially installed and unusable state, requiring manual intervention to cleanup and repair the system.

What is claimed is:

1. A method of managing installation of a set of data processing components onto a data processing system, the method comprising:
    a database containing a lists of required components for a plurality of functional roles, said database including a predefined function-specific groups of components having fixed prerequisites and function-specific dependencies, system capabilities required for each of said plurality of functional roles, and temporary requirements required at install and runtime;
    a plurality of role groups associated with said plurality of functional roles defining a plurality of deployable functions selectable by a user managing the installation of said set of data processing components; and
    responsive to specification of data processing functions which are to be performed within a data processing system by said user, invoking an installation process to determine, by accessing said database, the set of data processing components required for deployment to perform the specified functions and then to install the respective determined set of data processing components onto the data processing system.

2. The method according to claim 1, wherein the step of determining a set of required components comprises the installation process accessing a table which lists, for each of said plurality of functional roles within potential data processing solutions, a group of data processing components required for performing the respective functional roles, the installation process using functional roles specified by said user to retrieve from the table the respective list of components and then to install the components identified in the list.

3. The method according to claim 2, wherein said functional roles comprise a set of separable units of function of a data processing solution such that a data processing solution can be partitioned into and represented by a selection of the functional roles within the set.

4. The method according to claim 2, wherein the step of determining the set of data processing components is responsive to specification of a plurality of data processing functions corresponding to the plurality of functional roles to retrieve from the table the respective lists of components for the plurality of functional roles, to merge said lists and then to Install the components identified in the lists.

5. The method according to claim 1, including checking whether a data processing system satisfies installation-time system requirements before installing the data processing components.

6. The method according to claim 5, wherein the installation-time system requirements include temporary disk space requirements.

7. A computer program product comprising a plurality of computer program components recorded on a machine-readable recording medium, wherein the plurality of program components includes:
    a set of installable computer program components;
    a database containing a lists of required components for a plurality of functional roles, said database including a predefined function-specific groups of components having fixed prerequisites and function-specific dependencies, system capabilities required for each of said plurality of functional roles, and temporary requirements required at install and runtime;

a plurality of role groups associated with said plurality of functional roles defining a plurality of deployable functions selectable by a user managing the installation of said set of data processing components; and an installation manager program which is responsive to specification of data processing functions by said user to be performed within a data processing system to determine which subset of the set of data processing components required to perform the specified functions, wherein the step of determining is performed by referencing predefined function-specific groups of components, and then to install the determined subset of data processing components onto the data processing system.

8. A computer program product, comprising program code recorded on a machine-readable recording medium, for controlling the operation of a data processing system on which the program code runs to perform a method of managing installation of a set of data processing components onto the data processing system, the computer program code comprising:

a database containing a lists of required components for a plurality of functional roles, said database including a predefined function-specific groups of components having fixed prerequisites and function-specific dependencies, system capabilities required for each of said plurality of functional roles, and temporary requirements required at install and runtime;

a plurality of role groups associated with said plurality of functional roles defining a plurality of deployable functions selectable by a user managing the installation of said set of data processing components; and an installation manager for determining, in response to specification of data processing functions by said user to be performed within the data processing system, which set of data processing components required to perform the specified functions, wherein the step of determining is performed by referencing predefined functions-specific groups of components, and for installing the determined set of data processing components onto the data processing system.

9. A method of generating an installation program for managing installation of a set of data processing components onto a data processing system, the method comprising:

analyzing one or more data processing solution architectures to identify a set of separable functional roles which interoperate to provide the solution architectures;

partitioning a data processing solution architecture into groups of data processing components wherein each group of components corresponds to one of the identified functional roles;

providing a database containing a lists of required components for the set of functional roles, said database including a predefined function-specific groups of components having fixed prerequisites and function-specific dependencies, system capabilities required for each of the set of functional roles, and temporary requirements required at install and runtime;

providing a plurality of role groups associated with the set of functional roles defining a plurality of deployable functions selectable by a user managing the installation of said set of data processing components; and providing an installation program with a definition of each of the set of functional roles, each definition including a list of the data processing components of the respective group, wherein the installation program is responsive to specification of one or more functional roles to be implemented on a data processing system to access the respective definition and to access said database processing, and to install the respective group of data processing components for the specified one or more functional roles.

10. The method of generating an installation program according to claim 9, wherein said list of components and their correspondence to defined functional roles are provided in a table which is accessible to the installation program.

11. The method according to claim 10, wherein the table includes data relating to the system requirements of the group of components corresponding to each defined functional role.

12. The method according to claim 11, wherein the data relating to system requirements includes installation-time system requirements.

13. The method according to claim 12, wherein the installation-time system requirements includes temporary disk space requirements.

14. The method according to claim 9, including:

determining a global installation sequence for a set of data processing components corresponding to a set of functional roles, and providing the installation program with means for determining an installation sequence for the components of a specified functional role by comparing the data processing components of the role with the global installation sequence to identify the Installation sequence of said component within the global installation sequence.

* * * * *